(12) United States Patent
Kim

(10) Patent No.: US 8,113,859 B2
(45) Date of Patent: Feb. 14, 2012

(54) LAMP SOCKET AND DISPLAY DEVICE HAVING THE SAME

(75) Inventor: Jung-Ki Kim, Cheonan-si (KR)

(73) Assignee: Samsung Electronics Co., Ltd, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 12/701,981

(22) Filed: Feb. 8, 2010

(65) Prior Publication Data
US 2010/0267263 A1  Oct. 21, 2010

(30) Foreign Application Priority Data
Apr. 16, 2009  (KR) .................. 10-2009-0033246

(51) Int. Cl.
*H01R 33/02*  (2006.01)
(52) U.S. Cl. ........................................... 439/239
(58) Field of Classification Search .............. 439/239, 439/246, 236, 240, 241, 242, 247, 249, 250, 439/251
See application file for complete search history.

(56) References Cited

U.S. PATENT DOCUMENTS

| | | | | |
|---|---|---|---|---|
| 2,356,601 A * | 8/1944 | MacCarthy | .................... | 439/236 |
| 2,380,211 A * | 7/1945 | Biller | ............................ | 439/241 |
| 3,231,848 A * | 1/1966 | Ruehlemann | ................. | 439/637 |
| 4,158,221 A * | 6/1979 | Agabekov | .................... | 362/219 |
| 4,874,320 A * | 10/1989 | Freed et al. | .................... | 439/115 |
| 4,957,455 A * | 9/1990 | Horiuchi et al. | .............. | 439/548 |
| 5,025,350 A * | 6/1991 | Tienken | ........................ | 362/544 |
| 5,027,262 A * | 6/1991 | Freed | ........................ | 362/249.08 |
| 5,030,125 A * | 7/1991 | Toma et al. | .................... | 439/226 |
| 5,180,887 A * | 1/1993 | Agabekov | .................... | 174/72 B |
| 5,260,859 A * | 11/1993 | Lettenmayer | ................. | 362/219 |
| 6,086,408 A * | 7/2000 | Tanigawa | ..................... | 439/419 |
| 6,193,567 B1 * | 2/2001 | Hsieh | ............................ | 439/853 |
| 6,254,252 B1 * | 7/2001 | Coushaine et al. | ........... | 362/549 |
| 6,309,236 B1 * | 10/2001 | Ullrich | ......................... | 439/226 |
| 6,561,828 B2 * | 5/2003 | Henrici et al. | ................ | 439/239 |
| 7,140,895 B2 * | 11/2006 | Tuin et al. | ..................... | 439/246 |
| 7,189,095 B1 * | 3/2007 | Tseng | ........................... | 439/337 |
| 7,393,216 B2 * | 7/2008 | Masaki et al. | .................. | 439/81 |
| 7,399,190 B2 * | 7/2008 | Ohmori | ......................... | 439/226 |

(Continued)

FOREIGN PATENT DOCUMENTS

JP  10289610 A  * 10/1998

(Continued)

OTHER PUBLICATIONS

English Abstract for Publication No. 2001-210133.

(Continued)

*Primary Examiner* — Tulsidas C Patel
*Assistant Examiner* — Harshad Patel
(74) *Attorney, Agent, or Firm* — F. Chau & Associates, LLC

(57) ABSTRACT

A lamp socket constructed to achieve an ultrathin display device and minimize friction sound due to thermal expansion and shrinkage, and a display device having the lamp socket are provided. The lamp socket includes a first body part, a connection terminal that is connected to the first body part and is electrically connected to a lead of a lamp, a second body part that is spaced apart from the first body part, an elastic part that connects the first body part with the second body part and expands or shrinks in a lengthwise direction of the lamp, and a fixing part that extends from the second body part.

20 Claims, 14 Drawing Sheets

U.S. PATENT DOCUMENTS

| | | | |
|---|---|---|---|
| 7,503,786 B2 * | 3/2009 | Kato et al. | 439/239 |
| 7,527,510 B2 * | 5/2009 | Yoo | 439/232 |
| 7,575,487 B2 * | 8/2009 | Yodogawa | 439/830 |
| 7,806,710 B2 * | 10/2010 | Hwang | 439/239 |
| 7,883,231 B2 * | 2/2011 | Cho et al. | 362/97.1 |
| 2002/0048999 A1 * | 4/2002 | Ming-Hui | 439/660 |
| 2004/0219839 A1 * | 11/2004 | Faust et al. | 439/682 |
| 2006/0030191 A1 * | 2/2006 | Tuin et al. | 439/246 |
| 2007/0037427 A1 * | 2/2007 | Miyazono | 439/232 |
| 2008/0146060 A1 * | 6/2008 | Kato et al. | 439/171 |
| 2008/0261428 A1 * | 10/2008 | Brodeur | 439/246 |
| 2009/0046462 A1 * | 2/2009 | Park et al. | 362/249 |
| 2009/0190060 A1 * | 7/2009 | Choi | 349/58 |
| 2009/0280695 A1 * | 11/2009 | Sekela et al. | 439/699.2 |
| 2010/0173540 A1 * | 7/2010 | Lee et al. | 439/861 |

FOREIGN PATENT DOCUMENTS

| | | |
|---|---|---|
| JP | 2001-210133 | 8/2001 |
| JP | 2007-287515 | 11/2007 |
| KR | 1020080055092 | 6/2008 |
| KR | 1020080104464 | 12/2008 |

OTHER PUBLICATIONS

English Abstract for Publication No. 2007-287515.
English Abstract for Publication No. 1020080055092.
English Abstract for Publication No. 1020080104464.

* cited by examiner

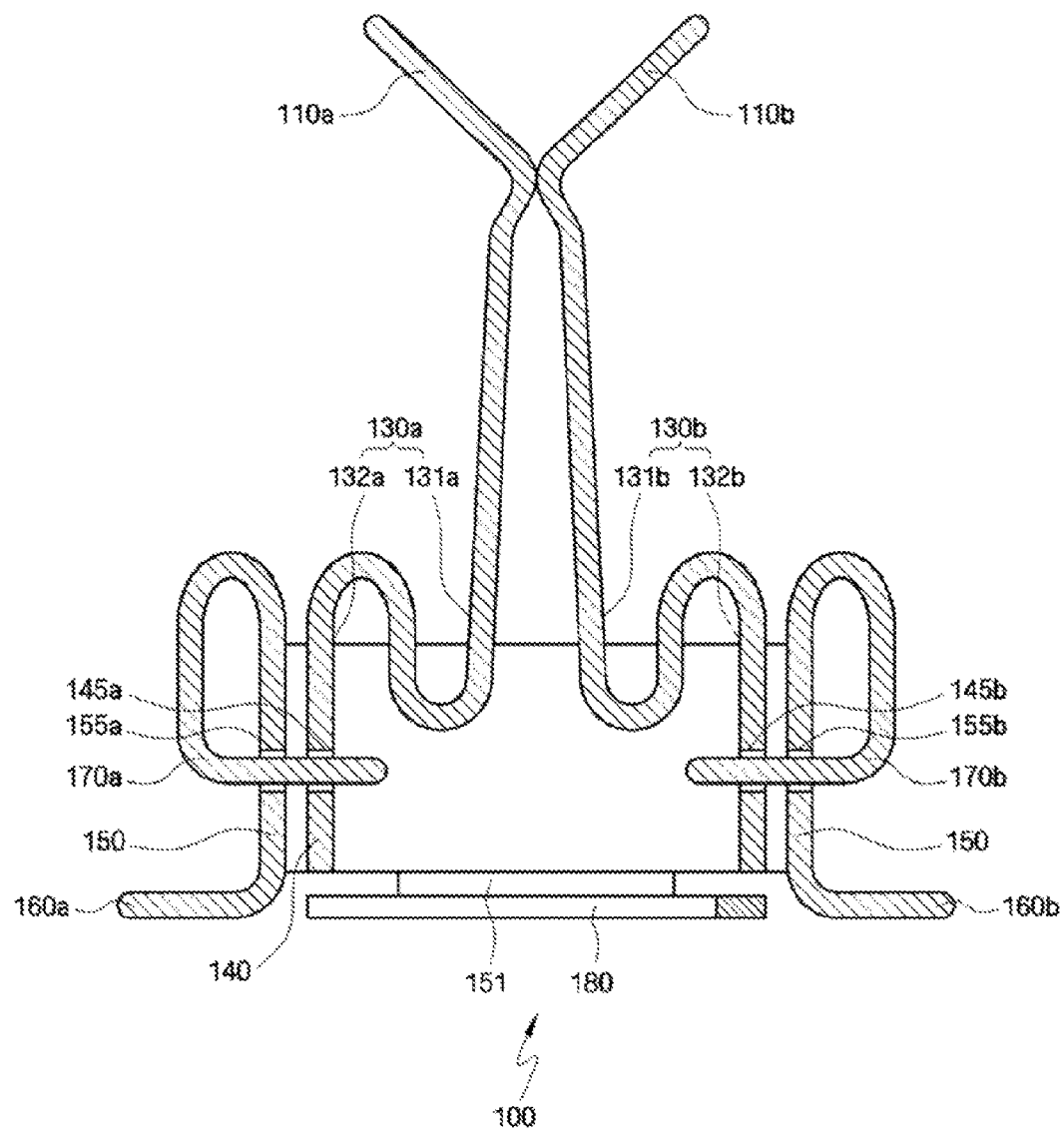

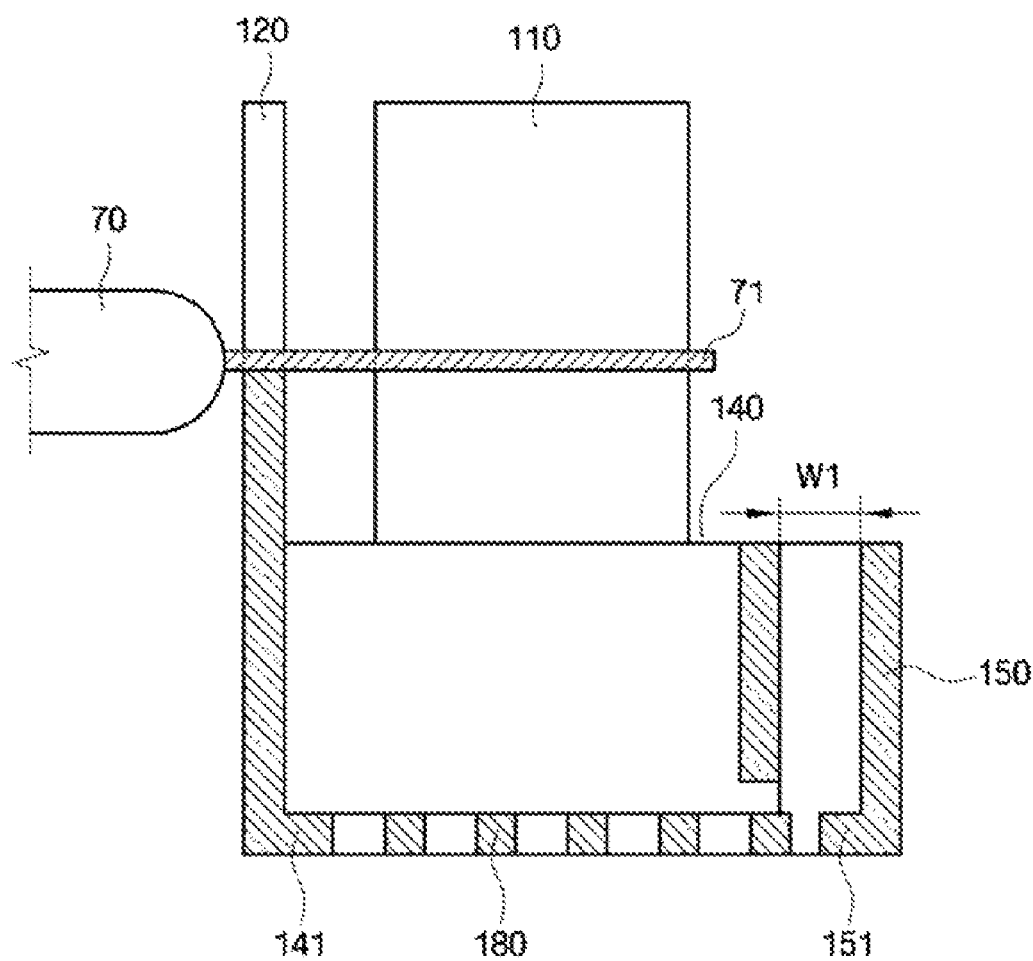

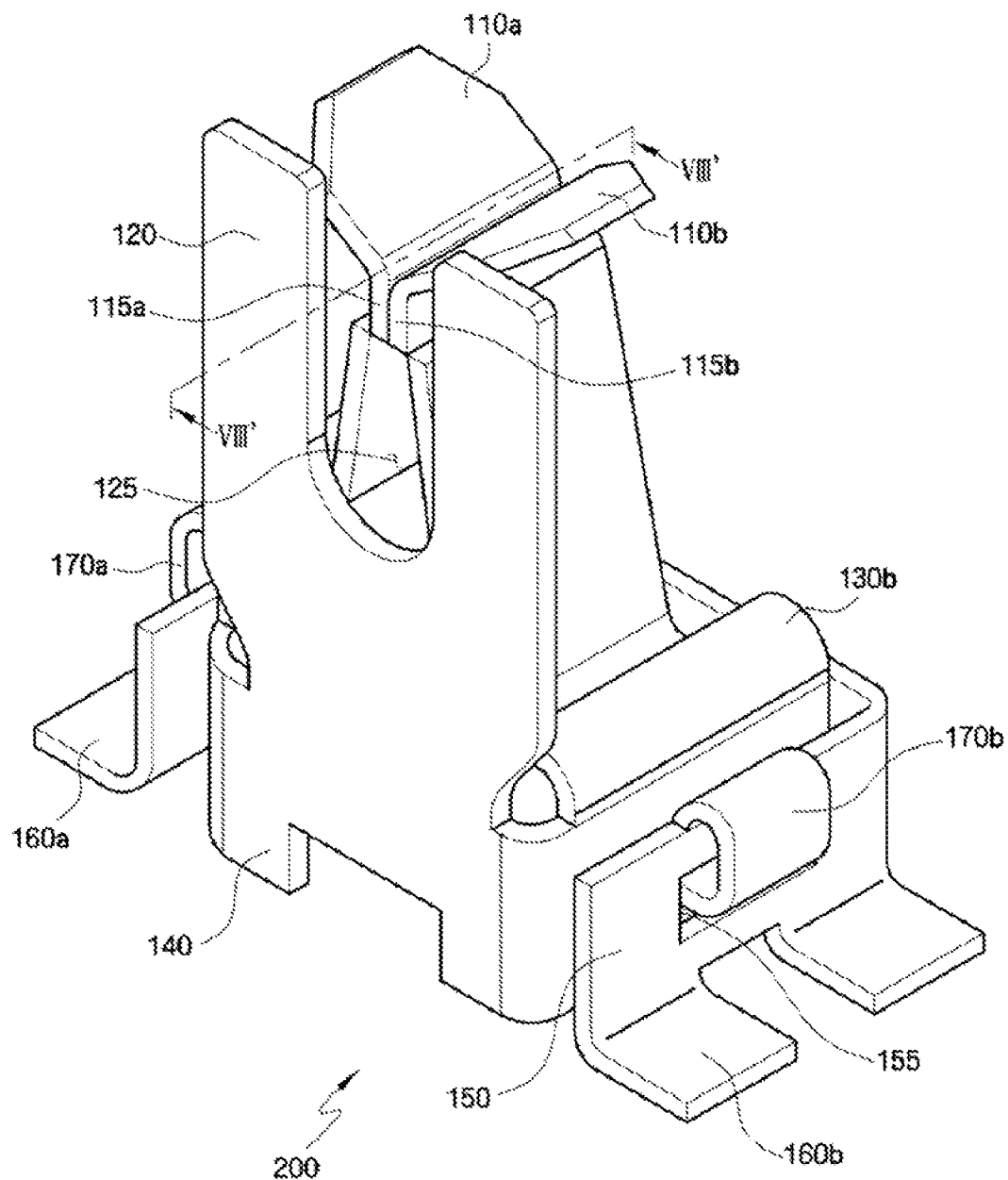

LAMP SOCKET AND DISPLAY DEVICE HAVING THE SAME

CROSS-REFERENCE TO RELATED APPLICATION

This application claims priority from Korean Patent Application No. 10-2009-0033246 filed on Apr. 16, 2009 in the Korean Intellectual Property Office, the disclosure of which is incorporated herein by reference in its entirety.

BACKGROUND OF THE INVENTION

1. Technical Field

The present invention relates to a lamp socket, and more particularly, to a lamp socket and a display device having the lamp socket.

2. Discussion of the Related Art

A liquid crystal display (LCD) is one form of a flat panel display that is now widely used. The LCD is provided with two substrates on which field-generating electrodes are formed, and a liquid crystal layer that is interposed between the substrates. In the LCD, a voltage is applied to the electrodes to rearrange the liquid crystal molecules of the liquid crystal layer, thereby controlling the quantity of transmitted light.

Since the LCD cannot emit light by itself, it may require a backlight assembly including a light source for supplying light to the LCD to display an image. The backlight assembly radiates light from a rear side of a LCD panel and serves as a surface light source for uniformly providing light throughout the LCD panel. Depending on the location the light source of supplying light to the LCD panel, the backlight assembly may be classified as either an edge-type backlight assembly or a direct-type backlight assembly. The direct-type backlight assembly provides a light source directly below the LCD panel, while the edge-type backlight assembly provides a light source at a lateral side of the LCD panel to transmit light throughout the LCD panel using a light guiding plate.

A lamp used as a light source may heat the LCD, and the heat generated from the lamp may expand the lamp itself or various functional elements of the LCD. When the lamp is turned off, the expanded lamp and/or the functional elements may undergo shrinkage. In such a manner, the lamp or and/or the functional elements may undergo repeated cycles of expansion and shrinkage. Accordingly, friction caused by the cycles may generate sound between the interconnected functional elements. This friction may, for example, be caused by undue flexing of elements of the LCD that are not intended to move. This undue flexing may eventually lead to breakage that may compromise the dependability of the LCD.

In particular, since the lamp and the leads formed at opposite ends of the lamp experience a sharp change in expansion and shrinkage ratios in the lengthwise direction of the lamp, the friction sound between the lamp and the lamp socket may be generated.

SUMMARY OF THE INVENTION

Exemplary embodiments of the present invention provide a lamp socket that contributes to an ultrathin display device that minimizes friction sound due to thermal expansion and shrinkage.

Exemplary embodiments of the present invention also provide an ultrathin display device having a lamp socket that minimizes friction sound due to thermal expansion and shrinkage.

These and other aspects of exemplary embodiments of the present invention will be described in detail below with reference to the figures.

According to an aspect of the present invention, a lamp socket includes a first body part. A connection terminal is connected to the first body part and is electrically connected to a lead of a lamp. A second body part is spaced apart from the first body part. An elastic part, for example, a springing component, connects the first body part with the second body part and expands or shrinks in a lengthwise direction of the lamp. A fixing part extends from the second body part.

According to an aspect of the present invention, a display device includes a lamp that radiates light. A lamp socket includes a first body part. A connection terminal is connected to the first body part and is electrically connected to a lead of a lamp. A second body part is spaced apart from the first body part. An elastic part connects the first body part with the second body part and expands or shrinks in a lengthwise direction of the lamp. A fixing part extends from the second body part.

BRIEF DESCRIPTION OF THE DRAWINGS

The above and other features and aspects of exemplary embodiments of the present invention will become more apparent by the description below with reference to the attached drawings in which:

FIG. 4 is a is a cross-sectional view of the lamp socket taken along line IV-IV' of FIG. 1;

FIGS. 5A and 6A are schematic side views for explaining an operation of the lamp socket shown in FIG. 1;

FIG. 7 is a perspective view of an exemplary lamp socket according to an exemplary embodiment of the present invention;

DETAILED DESCRIPTION OF EXEMPLARY EMBODIMENTS

Aspects and features of exemplary embodiments of the present invention and methods of accomplishing the same may be understood more readily by reference to the following detailed description and the accompanying drawings. The present invention may, however, be embodied in many different forms and should not be construed as being limited to the embodiments set forth herein.

Figure 1:
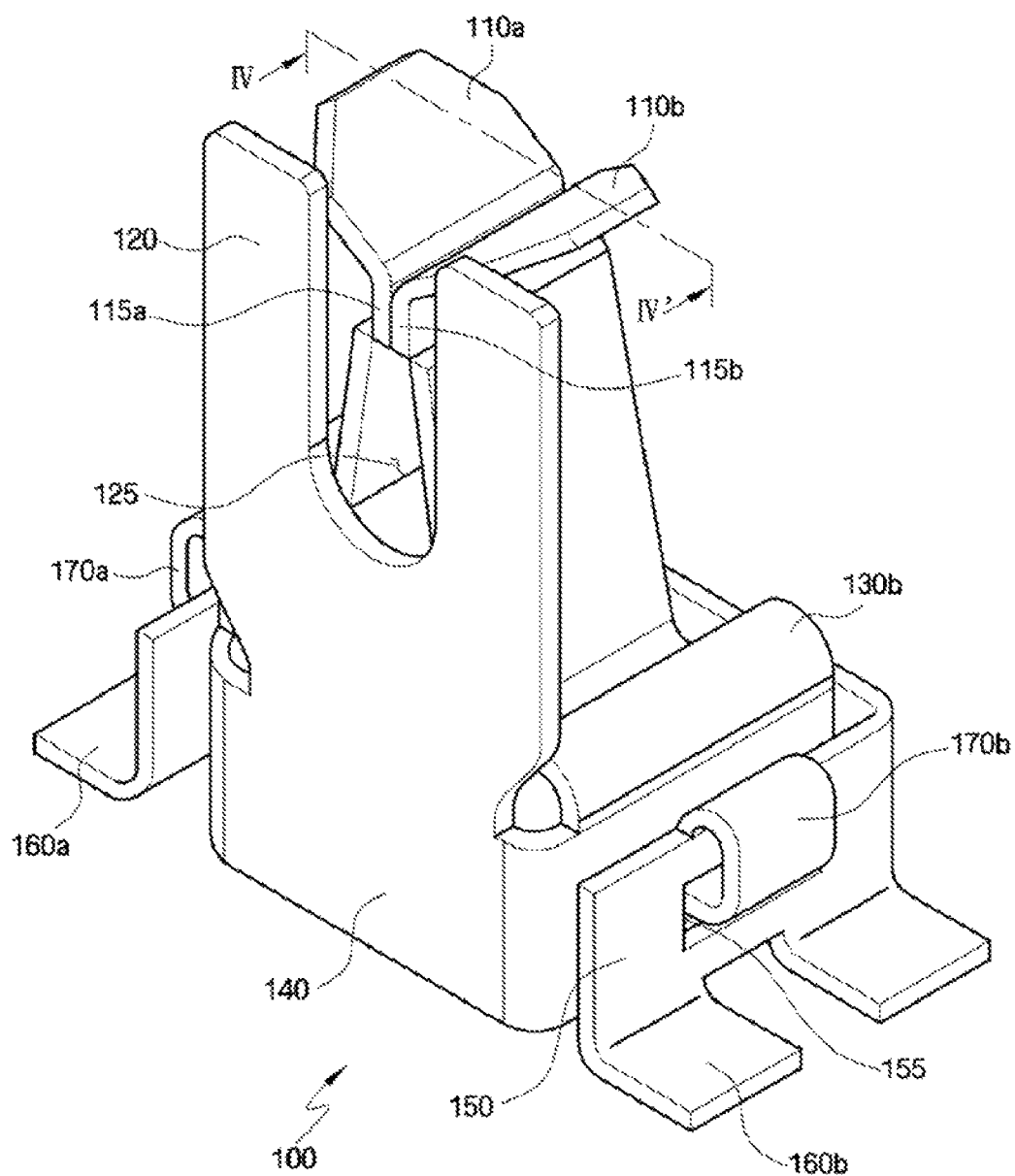
FIG. 1 is a perspective view of an exemplary lamp socket according to an exemplary embodiment of the present invention.
Figure 2:
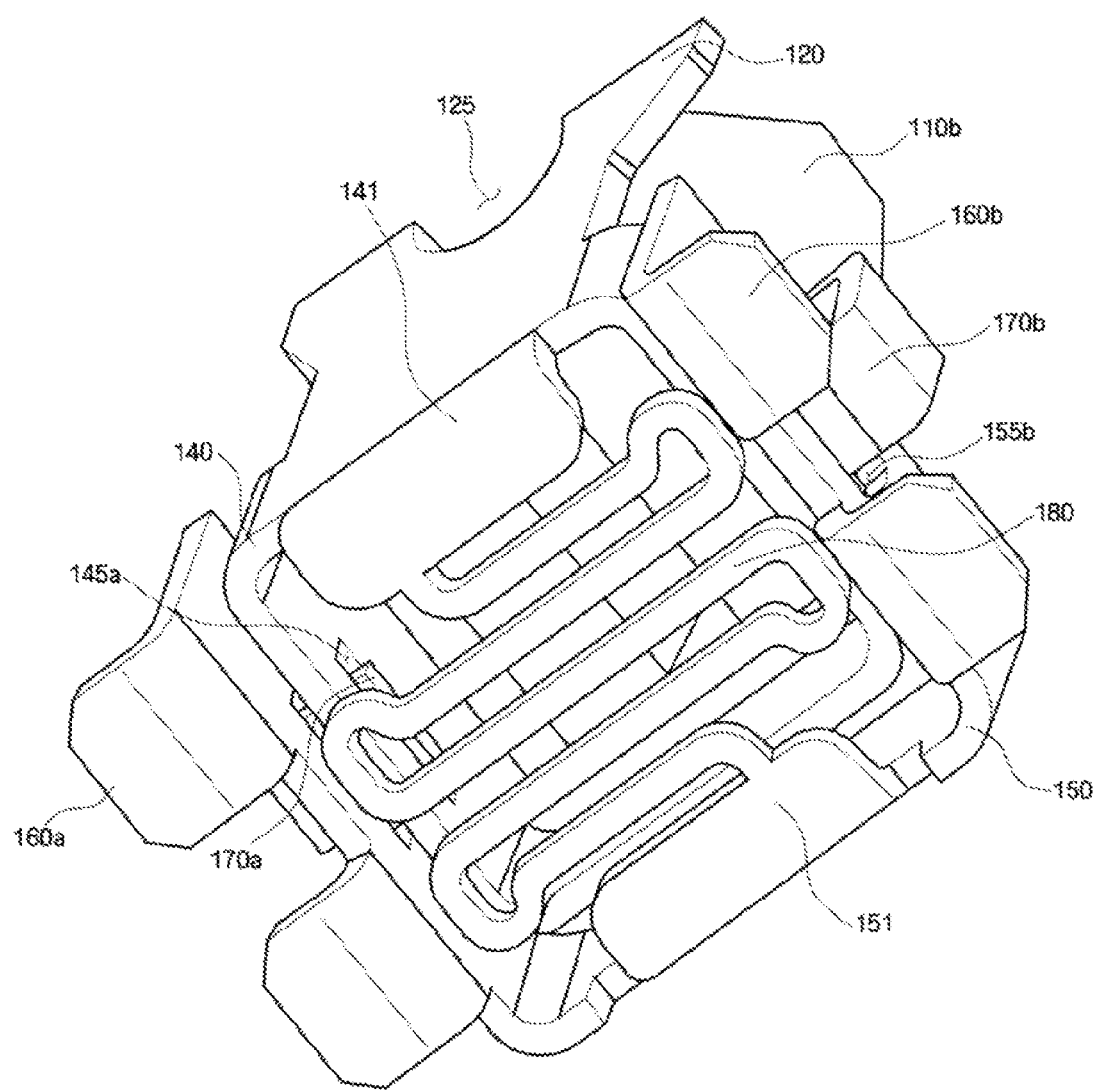
FIG. 2 is a bottom view of the lamp socket shown in FIG. 1.
Figure 3:
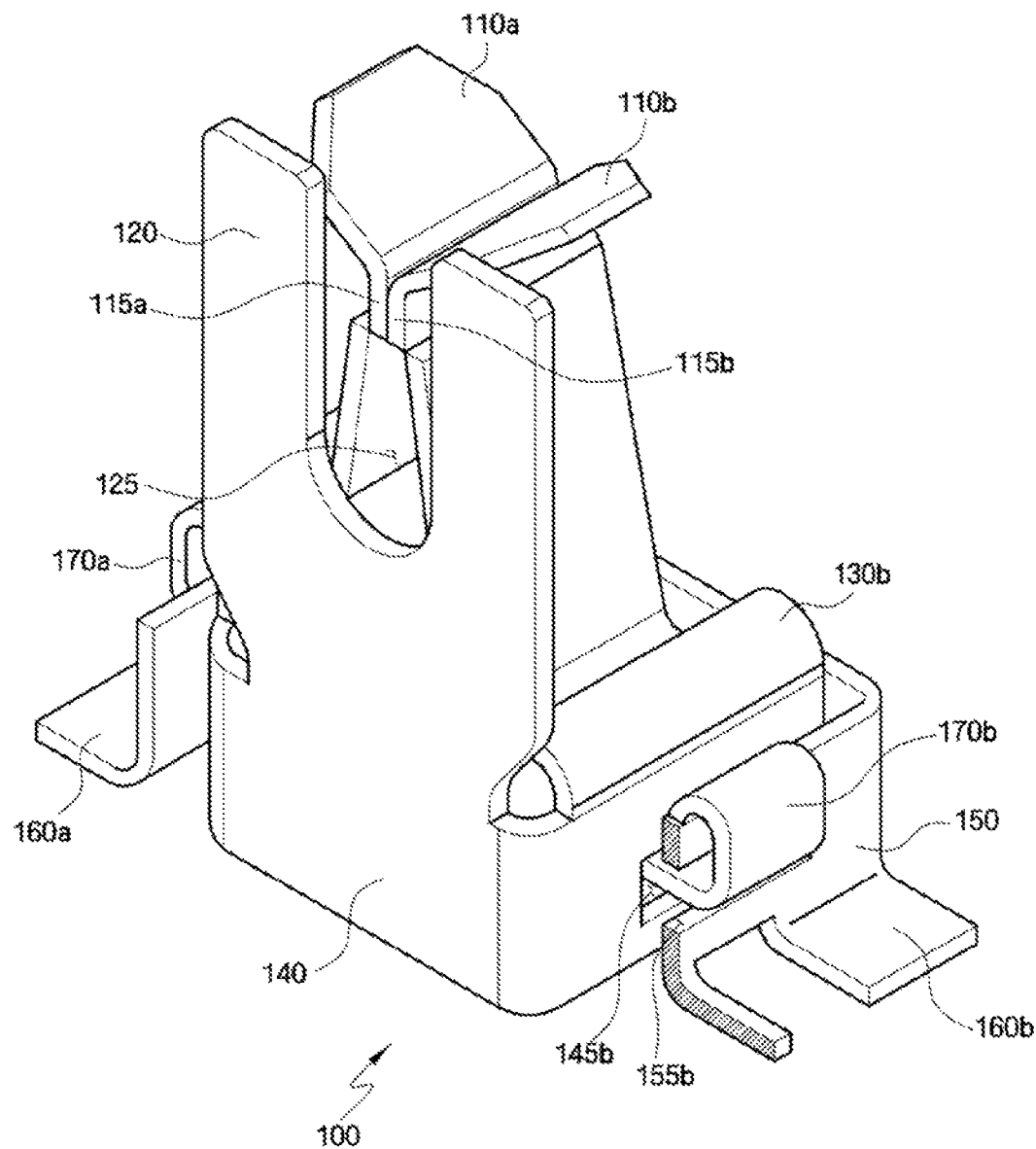
FIG. 3 is a partly exploded perspective view of the lamp socket shown in FIG. 1.

Hereinafter, a lamp socket according to an exemplary embodiment of the present invention will be explained in detail with reference to the accompanying drawings. FIG. 1 is a perspective view of an exemplary lamp socket according to an exemplary embodiment of the present invention. FIG. 2 is a bottom view of the lamp socket shown in FIG. 1. FIG. 3 is a partly exploded perspective view of the lamp socket shown in FIG. 1. FIG. 4 is a cross-sectional view of the lamp socket taken along line IV-IV' of FIG. 1.

Referring to FIGS. 1 and 2, the lamp socket 100 serves to fix a lamp (70 of FIG. 12) and supply power to the lamp 70, and includes a first body part 140, a first connection terminal 110a, a second connection terminal 110b, a first bent part (130a of FIG. 4), a second bent part 130b, a support plate 120, a second body part 150, an elastic part 180, which may be, for example, a spring component, guide parts 170a and 170b, and fixing parts 160a and 160b. The lamp socket 100 may be formed of a conductive material that may include, for example, a metal and/or a conductive elastomer. The conductive elastomer may refer, for example, to a polymeric material characterized by being elastically deformable while having electric conductivity. The conductive elastomer may be prepared, for example, by embedding conductive metal scraps in an elastic body such as rubber. The conductive elastomer may be a functional element substance forming all or some of the lamp socket 100 as well as the elastic part 180.

In the lamp socket 100, the first body part 140, the first connection terminal 110a, the second connection terminal 110b, the first bent part 130a, the second bent part 130b, the support plate 120, the second body part 150, the elastic part 180, the guide parts 170a and 170b and the fixing parts 160a and 160b may be integrally formed. For example, these functional elements may be formed of a single metal sheet by sheet-metal processing.

The first connection terminal 110a and the second connection terminal 110b fix a lead (71 of FIG. 5A) provided at one side of the lamp 70 and supply power to the lamp 70. For example, the first connection terminal 110a and the second connection terminal 110b fix the lead 71 of the lamp 70 by applying pressure to the lead 70 from opposing sides of the lamp 70. The first connection terminal 110a and the second connection terminal 11013 extend from the first body part 140. The first bent part 130a is formed between the first body part 140 and the first connection terminal 110a, and the second bent part 130b is formed between the first body part 140 and the second connection terminal 110b.

The first connection terminal 110a and the second connection terminal 110b connected to the first bent part 130a and the second bent part 130b, respectively, may be fixed by clamping the lead 71 of the lamp 70 by means of, e.g., a pair of nippers. Accordingly, the lamp 70 can be easily attached to/detached from the lamp socket 100. The first bent part 130a and the second bent part 130b are connected to the first body part 140, respectively, and may be integrally formed with the first body part 140. For example, the first bent part 130a and the second bent part 130b may be integrally formed by bending one end of the first body part 140.

Meanwhile, the first body part 140 constitutes a basic framework of the lamp socket 100, along with the second body part 150. The first body part 140 is disposed inside the second body part 150, so that the first body part 140 and the second body part 150 form a dual structure.

The first connection terminal 110a, the second connection terminal 110b and the support plate 120 are connected to the first body part 140.

The first body part 140 has a box-shape having an internal space surrounded by four sidewalls. The first body part 140 may be formed by bending a single metal sheet, and may have a support plate 120, a first connection terminal 110a and a second connection terminal 110b extending to its upper portion, and an elastic part 180 extending to its lower portion through the first connection part 141. The elastic part 180 has both ends connected to the first body part 140 and the second body part 150 through the first connection part 141 and the second connection part 151, respectively.

The first bent part 130a and second bent part 130b transfer a sufficient elastic force to the first connection terminal 110a and the second connection terminal 110b, respectively.

For example, the lead 71 of the lamp 70 may be fixed by the elastic force of the first connection terminal 110a and the second connection terminal 110b. When the elastic force of the first connection terminal 110a and the second connection terminal 110b is not sufficiently high to fix the lead 71 of the lamp 70, insertion/separation of the lead 71 of the lamp 70 into/from the lamp socket 100 may not be easily achieved, and the lamp 70 may be easily detached from the lamp socket 100.

Sufficient elastic force may be imparted to the first connection terminal 110a and the second connection terminal 110b by forming the first and second connection terminals 110a and 110b of a material having sufficiently high elasticity. Alternatively, the first connection terminal 110a and the second connection terminal 110b may be formed to have appropriate shapes.

First, a material used for forming the first connection terminal 110a and the second connection terminal 110b may be a metallic material. The first connection terminal 110a and the second connection terminal 110b may be formed to have shapes capable of maintaining appropriate rigidity and elasticity. Here, the first bent part 130a and the second bent part 130b are constructed to transfer appropriate rigidity and elasticity to the first connection terminal 110a and the second connection terminal 110b.

The LCD (1 of FIG. 11) may be made to have an ultra slim profile by minimizing a height of the lamp socket 100. Minimizing the height of the lamp socket 100, however, may be associated with decreasing lengths of the first connection terminal 110a and the second connection terminal 110b, which may result in a reduction in the elasticity. To avoid this reduction in elasticity, the first connection terminal 110a and the second connection terminal 110b are bent at least two times, thereby forming the first bent part 130a and the second bent part 130b.

The first bent part 130a and the second bent part 130b may be bent to have 'S' shaped sections. As described above, the height of the lamp socket 100 can be reduced by bending the first bent part 130a and the second bent part 130b in an 'S' shape while transferring a sufficiently high elastic force to the first connection terminal 110a and the second connection terminal 110b. Here, in order to minimize the height of the lamp socket 100, the first bent part 130a and the second bent part 130b may be formed inside the first body part 140. If the first bent part 130a and the second bent part 130b extend in practice from the upper portion of the first body part 140, the first bent part 130a and the second bent part 130b may be formed such that at least one end of each of the first bent part 130a and the second bent part 130b is positioned inside the first body part 140.

The first bent part 130a and the second bent part 130b may be formed by bending one end of the first body part 140 in an 'S' shape. The first bent part 130a and the second bent part 130b substantially serve as springs.

The first bent part 130a includes a first part 131a connected to the first connection terminal 110a, and a second part 132a connected to the first body part 140. The second bent part 130b includes a first part 131b connected to the first connection terminal 110b, and a second part 132b connected to the first body part 140. Here, the first part 131a, 131b and the second part 132a, 132b are bent such that at least portions of the first part 131a, 131b and the second part 132a, 132b overlap each other.

The support plate 120 is formed in front of the first body part 140. The support plate 120 in front of the first body part 140 extends toward an upper portion of the first body part 140. The support plate 120 is formed in a plate shape, constituting a basic framework of the lamp socket 100 and restricting movement of the lead 71 of the lamp 70. The support plate 120 has a lead insertion hole 125 opened at its top surface.

The support plate 120 prevents the lead 71 of the lamp 70 from deviating downward with respect to the first connection terminal 110a and the second connection terminal 110b. Accordingly, the lead 71 of the lamp 70 is inserted into the lead insertion hole 125 to then be fixed by the first connection terminal 110a and the second connection terminal 110b. Meanwhile, the lead insertion hole 125 may be formed on the support plate 120 in a 'U' shaped hole.

The lamp socket 100 includes a first stopper element 115a and a second stopper element 115b for preventing a terminal of the lamp 70 from deviating upward. The first stopper element 115a and the second stopper element 115b are formed at one side of the first connection terminal 110a and the second connection terminal 110b, respectively. The first stopper element 115a is formed at one side of the first connection terminal 110a and protrudes toward the second connection terminal 110b. Meanwhile, the second stopper element 115b is formed at one side of the second connection terminal 110b and protrudes toward the first connection terminal 110a.

The first stopper element 115a and the second stopper element 115b may be formed by bending one end of the first connection terminal 110a and the second connection terminal 110b, respectively. Thus, the lead 71 of the lamp 70 interposed between the first connection terminal 110a and the second connection terminal 110b is disposed below the first stopper element 115a and the second stopper element 115b, respectively. The first stopper element 115a and the second stopper element 115b prevent the lead 71 of the lamp 70 from deviating upward.

The second body part 150 constitutes a basic framework of the lamp socket 100 along with the first body part 140, and the second body part 150 surrounds the first body part 140. The first body part 140 and the second body part 150 are connected to the elastic part 180, so that positions of the first body part 140 and the second body part 150 may change relative to each other. For example, assuming that the second body part 150 is positioned at a fixed location, the first body part 140 may move within a range of elastic deformation of the elastic part 180.

The second body part 150 fixes the lamp socket 100 to a circuit board (11 of FIG. 10), and the first body part 140 fixes the lamp 70. The lamp 70 can be movably attached to the circuit board 11 by the elastic part 180 connecting the first body part 140 and the second body part 150.

The second body part 150 may be integrally formed with the first body part 140 and the elastic part 180, for example, using a single metal sheet. The second body part 150 may be formed along the outer periphery of the first body part 140 such that the lamp socket 100 is securely attached to the circuit board 11.

The fixing parts 160a and 160b support the second body part 150 and fix the lamp socket 100. The fixing parts 160a and 160b extend downward toward the second body part 150 and are bent to the exterior of the second body part 150. At least one of the fixing parts 160a and 160b may be formed below the second body part 150. Alternatively, the fixing parts 160a and 160b may be formed at both sides of the second body part 150. The fixing parts 160a and 160b may be formed such that they extend from the second body part 150 in a direction perpendicular to a lengthwise direction of the lamp 70.

The fixing parts 160a and 160b may be integrally formed with the second body part 150, and may act as external power-applying terminals. The fixing parts 160a and 160b may be attached to the second body part 150 by surface mount technology (SMT).

The elastic part 180 connects the first body part 140 and the second body part 150, and has elasticity so that it may shrink to be deformable when an external force is applied from either the first body part 140 or the second body part 150. If the lamp 70 expands, for example, due to heat, the lead 71 of the lamp 70 can move through the elastic part 180.

If a voltage is applied to the lamp 70, the lamp 70 generates light and heat, and expands by the generated heat. In particular, the lamp 70 has a high expansion ratio in a lengthwise direction of the lamp 70. Accordingly, when the lamp 70 is heated, a length of the lamp 70 is increased, and friction may occur between the lamp 70 and the lamp socket 100 fixed at opposite ends of the lamp 70. Vibration and noises may be caused due to the friction.

The first body part 140 fixing the lamp 70 is constructed to move in a direction in which the lamp 70 expands so that friction between the lead 71 of the lamp 70 and the lamp socket may be minimized. As described above, the elastic part 180 is formed between the first body part 140 fixing the lamp 70 and the second body part 150 attached to the circuit board 11, thereby fixing the first body part 140 and the second body part 150. If a force exceeding a particular threshold is transferred to the first body part 140 and the second body part 150, the excessive force can be absorbed by the elastic part 180.

The elastic part 180 may be formed to expand and shrink in a lengthwise direction of the lamp 70 and thus force derived from expansion and shrinkage of the lamp 70 may be absorbed. For example, the elastic part 180 may have a serpentine configuration, an example of which may be seen in FIG. 2. The serpentine configuration may have a substantially sinusoidal pattern, and may include a structure in which various functional elements are repeated in a predetermined direction, like a spring. However, the shape of the elastic part 180 is not limited to the serpentine configuration, and may various configurations that may achieve the spring structure.

In addition, the structure of the elastic part 180 is not limited to the spring structure as described above, an electrically conductive member may be separately used as the elastic part 180.

The elastic part 180 may be positioned so as to connect lower portions of the first body part 140 and the second body part 150. However, the elastic part 180 may be provided at various positions according to the design of the lamp socket 100.

The second body part 150 is not limited to the described structure in which it surrounds an exterior side of the first body part 140, but includes, for example, a structure in which the first body part 140 surrounds the second body part 150, or a structure in which the first body part 140 and the second body part 150 are arranged in parallel with each other.

Where the second body part 150 surrounds the first body part 140, the elastic part 180 may be formed inside the first body part 140.

Referring to FIGS. 3 and 4, a guide structure may be provided between the first body part 140 and the second body part 150. The guide structure may facilitate relative motion of the first body part 140 and the second body part 150 in the lengthwise direction of the lamp. The guide structure guides the first body part 140 and the second body part 150 to move in the lengthwise direction of the lamp 70 while prohibiting the first body part 140 and the second body part 150 from moving in the radial direction of the lamp 70. The guide structure includes guide parts 170a and 170b, first guide grooves 145a and 145b, and second guide grooves 155a and 155b.

The first guide grooves 145a and 145b and second guide grooves 155a and 155b, which are cut in the lengthwise direction of the lamp 70, are formed on lateral surfaces of the first body part 140 and the second body part 150, respectively.

The first guide grooves 145a and 145b and the second guide grooves 155a and 155b may be formed to correspond to each other and may be elongated in the lengthwise direction of the lamp 70.

The guide parts 170a and 170b may be formed such that one end of the second body part 150 extends to penetrate through the second guide grooves 155a and 155b and the first guide grooves 145a and 145b, respectively. With respect to the lengthwise direction of the lamp 70, widths of the first guide grooves 145a and 145b and the second guide grooves 155a and 155b may be made greater than those of the guide parts 170a and 170b.

The guide parts 170a and 170b, the first guide grooves 145a and 145b and the second guide grooves 155a and 155b serve to prevent the first body part 140 and the second body part 150 from being applied with excessive external force or being deformed in a direction other than in the lengthwise direction of the lamp 70.

Each pair of the guide parts 170a and 170b, the first guide grooves 145a and 145b and the second guide grooves 155a and 155b may be radially disposed with respect to the lamp 70.

The guide parts 170a and 170b of the lamp socket 100 may be constructed such that one end of the second body part 150 extends to penetrate through the second guide grooves 155a and 155b and the first guide grooves 145a and 145b. The present invention, however, is not limited to the foregoing configuration of the lamp socket 100, and the lamp socket 100 may have, for example, a structure in which guide parts may protrude from any one of the first body part 140 and the second body part 150 and guide grooves may be formed in at least one of the first body part 140 and the second body part 150.

Figure 5B:
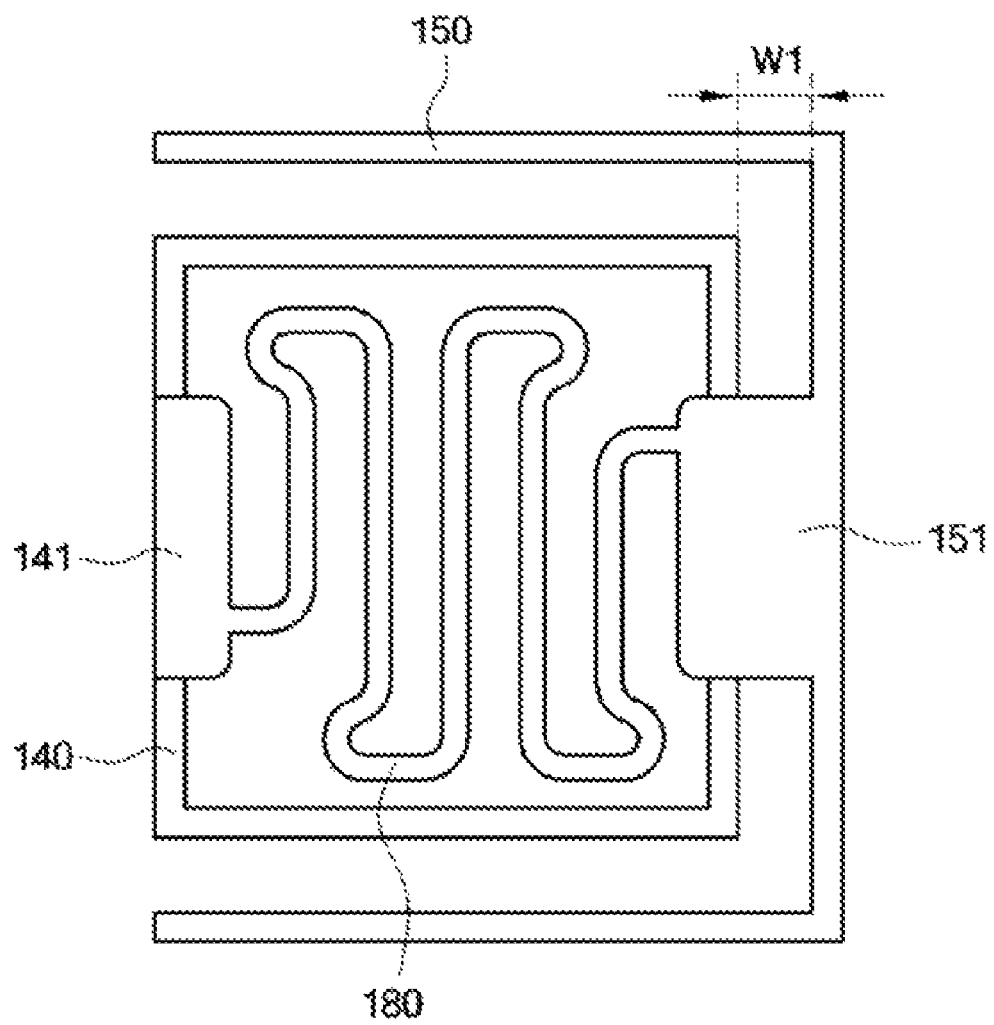
FIGS. 5B and 6B are schematic bottom views for explaining the operation of the lamp socket shown in FIG. 1.
Figure 6A:
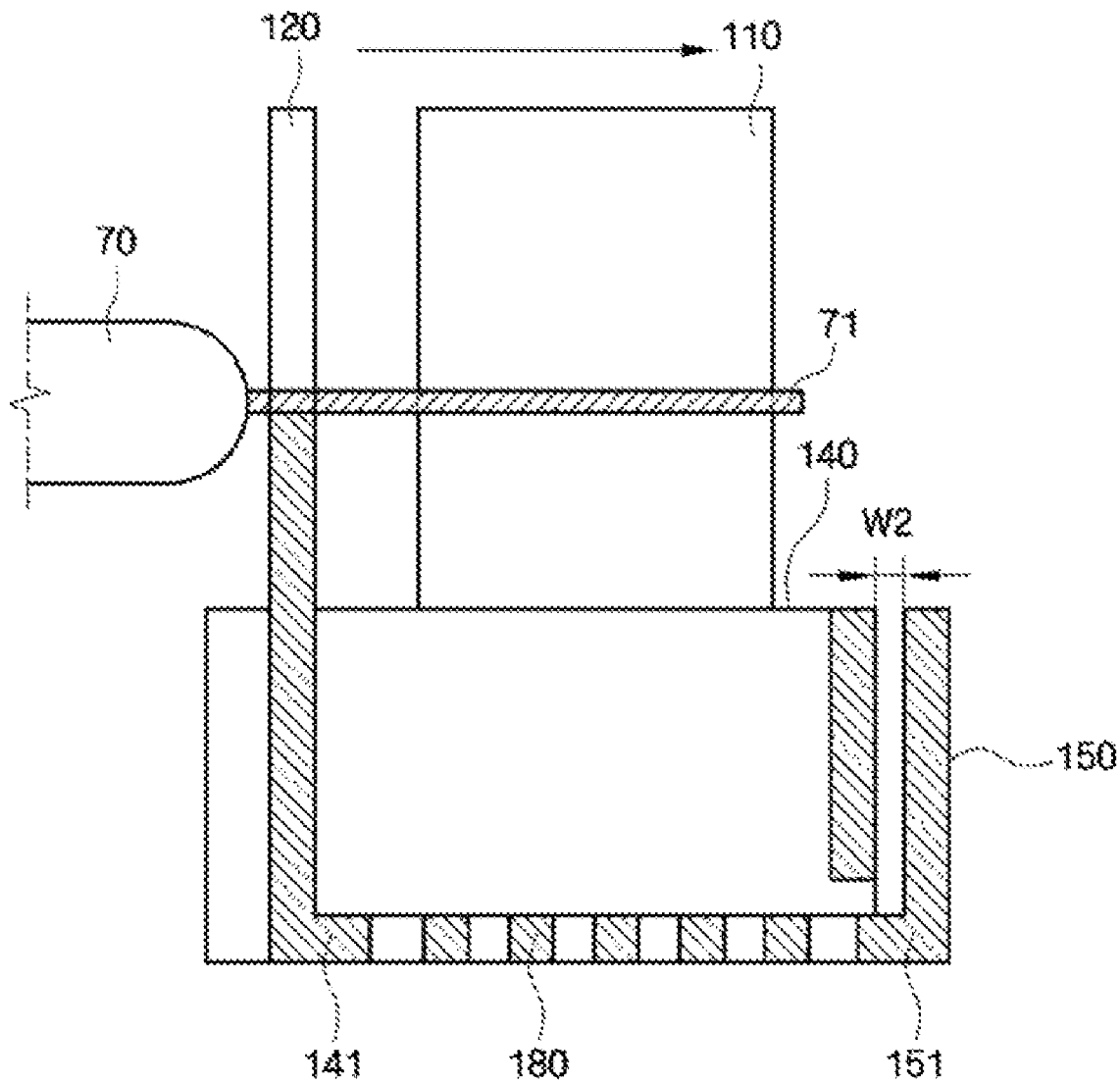
Figure 6B:
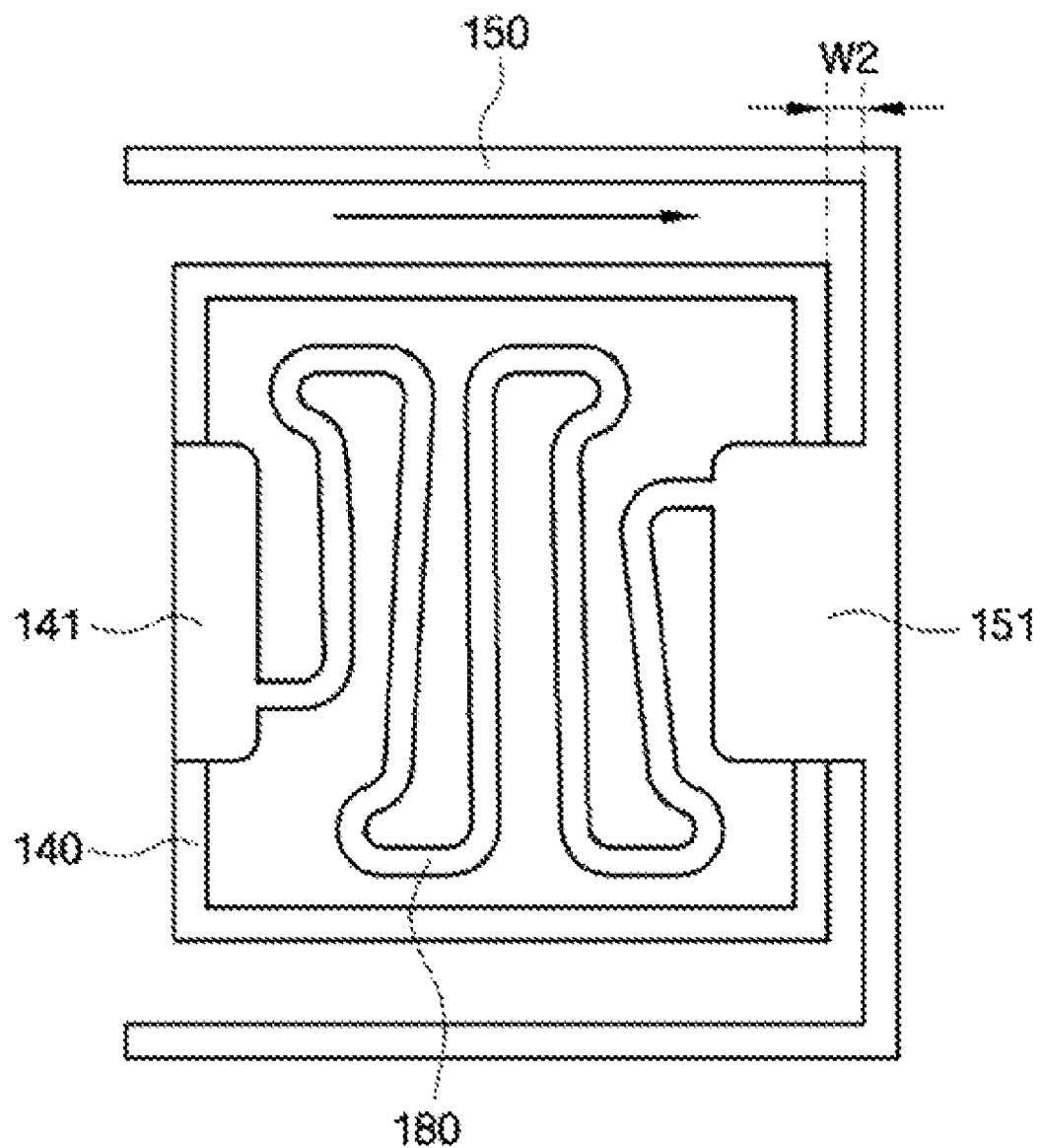

Hereinafter, an operation of the lamp socket shown in FIG. 1 will be explained in detail with reference to FIGS. 5A, 5B, 6A, and 6B. FIGS. 5A and 6A are schematic side views for explaining the operation of the lamp socket shown in FIG. 1, and FIGS. 5B and 6B are schematic bottom views for explaining the operation of the lamp socket shown in FIG. 1.

FIGS. 5A and 5B illustrate the lamp socket 100 in a case where the lamp 70 retains its original size.

The lead 71 of the lamp 70 is attached to a connection terminal 110 of the lamp socket 100. Here, the first body part 140 connected to the connection terminal 110 is spaced apart from the second body part 150 by a predetermined distance W1.

In addition, the elastic part 180 that connects the first body part 140 and the second body part 150 retains its original shape while no external force is applied.

FIGS. 6A and 6B illustrate the lamp socket 100 in a case where the lamp 70 expands in the lengthwise direction of the lamp 70.

When the lamp 70 expands, for example, by heat, in the lengthwise direction of the lamp 70, an external force is applied to the connection terminal 110 and the first body part 140, which fixes the lead 71 of the lamp 70. The external force is applied to the first body part 140 in the lengthwise direction of the lamp 70, and the external force due to thermal expansion of the lamp 70 is then transferred to the elastic part 180 connected between the first body part 140 and the second body part 150.

Since the second body part 150 is attached to the circuit board 11, the external force applied from the lamp 70 is absorbed by the elastic part 180 between the first body part 140 and the second body part 150.

When the external force is applied, the elastic part 180 shrinks in the lengthwise direction of the lamp 70 and stores the external force due to thermal expansion of the lamp 70. The elastic part 180 has a serpentine configuration and its length is reduced in the lengthwise direction of the lamp 70. The elastic part 180 can be formed to have appropriate elasticity by adjusting the overall length and thickness or the number of bent parts.

As the elastic part 180 shrinks, a relative distance W2 between the first body part 140 and the second body part 150 is reduced. The quantity of motion of the first body part 140 can be appropriately controlled through the design of the elastic part 180 in consideration of the external force applied from the lamp 70 and the elasticity of the elastic part 180.

Figure 8:
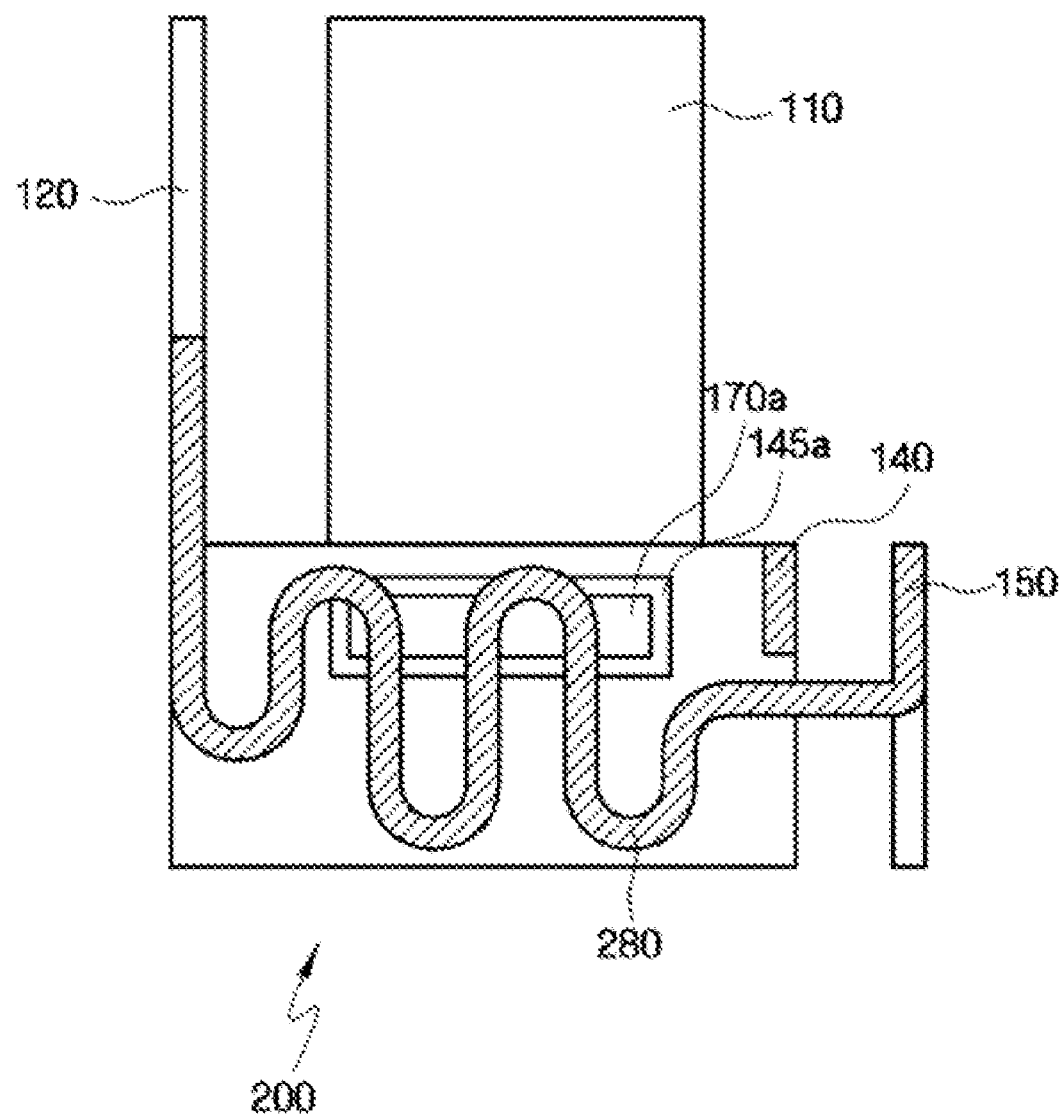
FIG. 8 is a is a cross-sectional view of the lamp socket taken along line of FIG. 7.

Hereinafter, a lamp socket according to an exemplary embodiment of the present invention will be described in detail with reference to FIGS. 7 and 8. FIG. 7 is a perspective view of an exemplary lamp socket according to an exemplary embodiment of the present invention, and FIG. 8 is a cross-sectional view of the lamp socket taken along line VIII-VIII' of FIG. 7. For convenience of explanation, functional elements having the same function as described above with reference to a previous figure are respectively identified by the same reference numerals and their repetitive description need not be repeated. It is to be understood that various aspects and features described above may be combined with various aspects and features described below.

In the lamp socket 200 according to an exemplary embodiment of the present invention, an elastic part 280 formed between a first body part 140 and a second body part 150 is bent in a vertical direction.

The lamp socket 200 includes a first body part 140, a first connection terminal 110a, a second connection terminal 110b, a first bent part (130a of FIG. 4), a second bent part 130b, a support plate 120, a second body part 150, an elastic part 280, guide parts 170a and 170b, and fixing parts 160a and 160b.

Except for the elastic part 280, the lamp socket 200 described herein with reference to FIGS. 7 and 8 has substantially the same functional elements as those of the lamp socket 100 discussed above with reference to FIGS. 1-4.

The elastic part 280 is connected between the first body part 140 and the second body part 150 and may absorb an external force applied to the space between the first body part 140 and the second body part 150. When an external force exceeding a particular threshold is applied to the first body part 140 and the second body part 150, the elastic part 280 absorbs the excessive force and allows the first body part 140 and the second body part 150 to move without causing a corresponding friction noise.

One end of the elastic part 280 may be connected to the first body part 140 and the other end of the elastic part 280 may be connected to the second body part 150. Where the second body part 150 has a structure in which it surrounds the first body part 140, the elastic part 280 may be formed inside the first body part 140. The elastic part 280 may have a serpentine configuration, an example of which may be seen in FIG. 8.

For example, the elastic part 280 may be formed to have vertically bent parts. For example, assuming that a bent surface of the elastic part 280 is referred to as a sinusoid, the elastic part 280 may have repeated patterns of crests and troughs. The elastic part 280 may have adjustable elasticity according to its overall length, width, and/or thickness. Since the width and length of the elastic part 280 are easily adjusted by forming the elastic part 280 to have vertically bent parts, the elasticity of the elastic part 280 can be easily engineered.

The elastic part 280 may connect lower portions of the first body part 140 and the second body part 150. The present invention, however, is not limited to the foregoing configuration of the elastic part 280, and the elastic part 280 may have any structure that can absorb an elastic force applied between the first body part 140 and the second body part 150. In addition, the elastic part 280 may be formed on either lateral surface of the first body part 140 or the second body part.

Figure 9A:
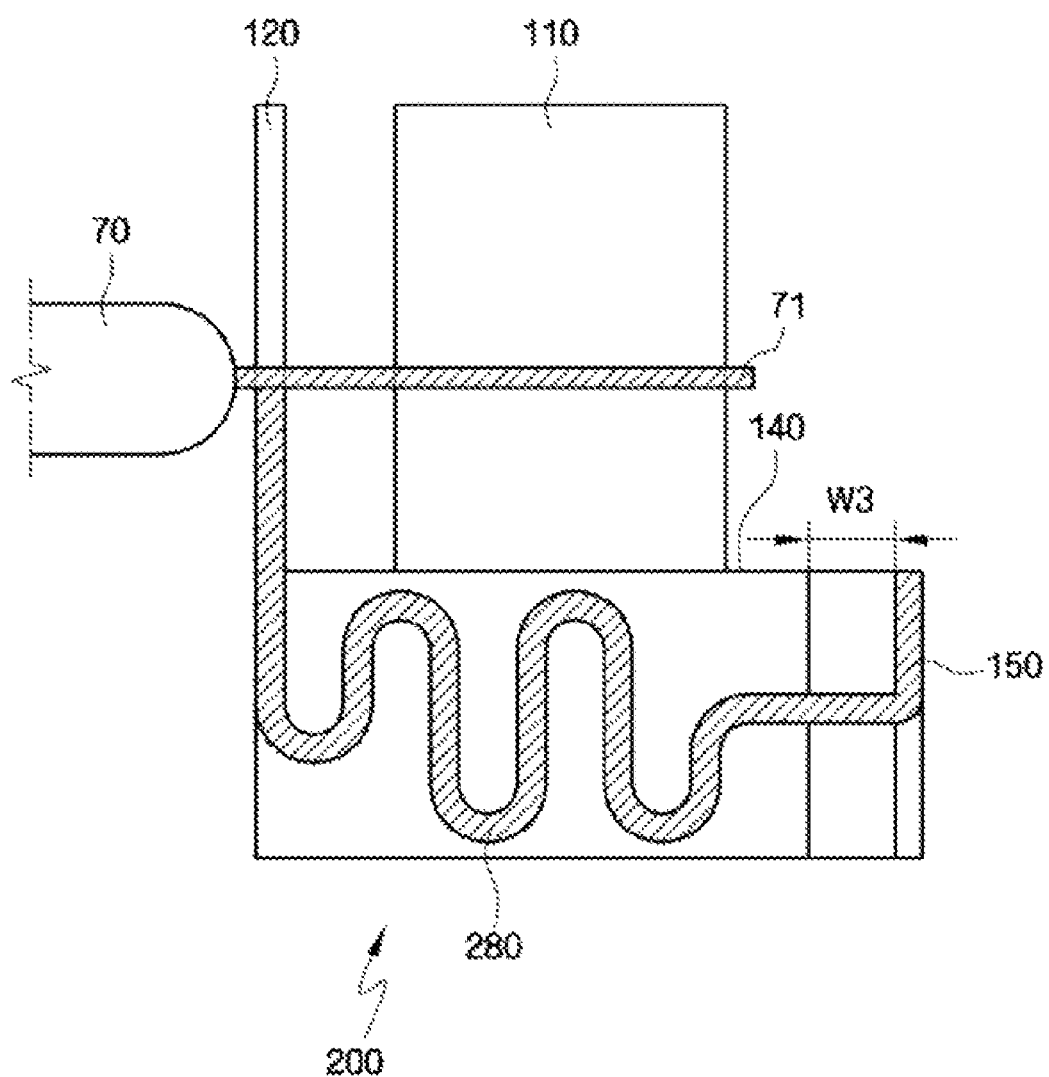
FIGS. 9A and 9B are schematic side views for explaining an operation of the lamp socket shown in FIG. 7.
Figure 9B:
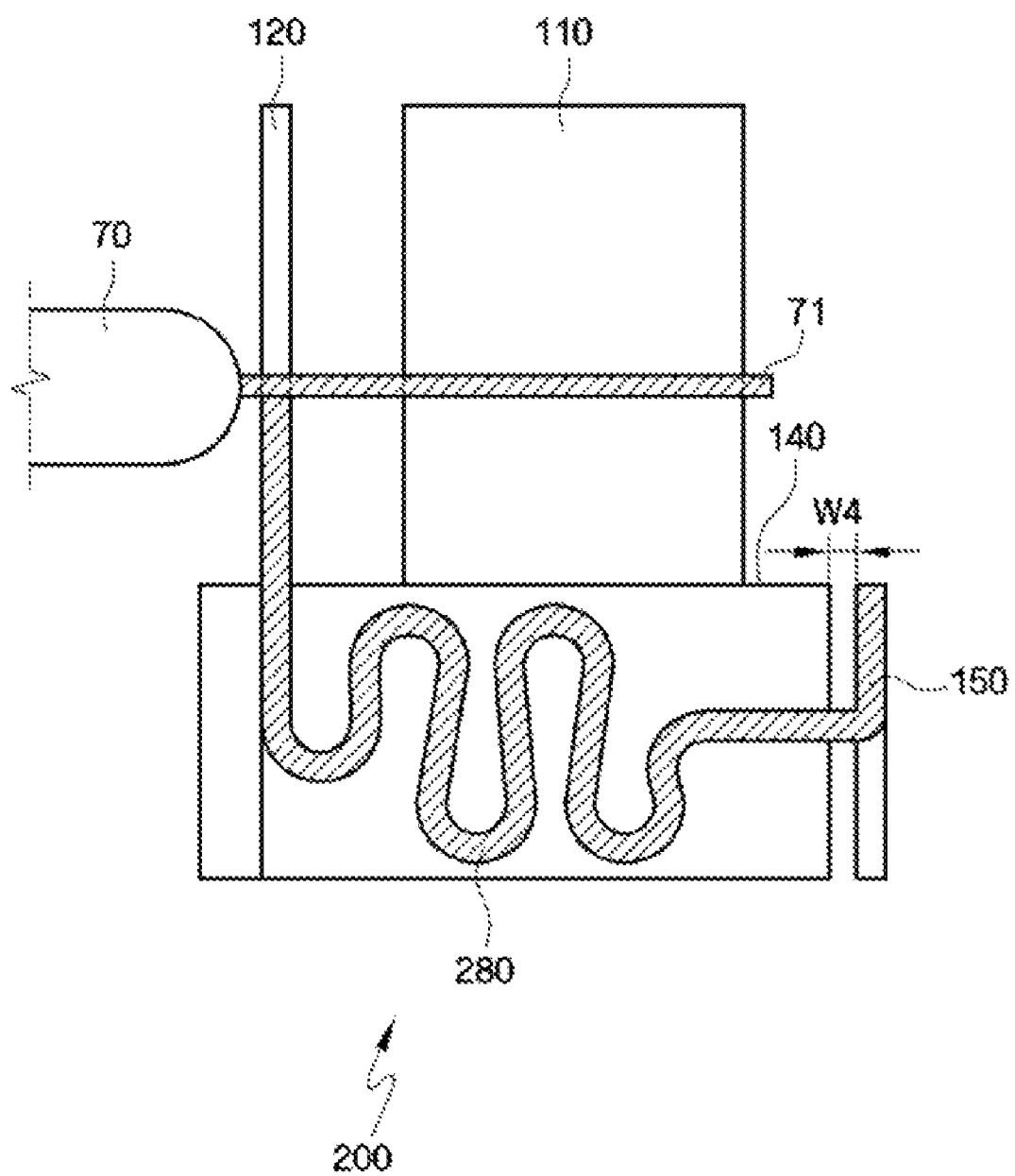

Hereinafter, an operation of the lamp socket shown in FIG. 7 will be explained in detail with reference to FIGS. 9A and 9B. FIGS. 9A and 9B are schematic side views for explaining an operation of the lamp socket shown in FIG. 7.

FIG. 9A illustrates the lamp socket 200 in a case where the lamp 70 retains its original size.

The lead 71 of the lamp 70 is attached to a connection terminal 110 of the lamp socket 200. Here, the first body part 140 connected to the connection terminal 110 is spaced apart from the second body part 150 by a predetermined distance W3.

In addition, the elastic part 280 that connects the first body part 140 and the second body part 150 retains its original shape while no external force is applied thereto.

FIG. 9B illustrates the lamp socket 200 in a case where the lamp 70 expands in the lengthwise direction of the lamp 70.

When the lamp 70 expands, for example, by heat, in its lengthwise direction, an external force is applied to the connection terminal 110 and the first body part 140, which fixes the lead 71 of the lamp 70. The external force is applied to the first body part 140 in the lengthwise direction of the lamp 70, and the external force due to thermal expansion of the lamp 70 is then transferred to the elastic part 280 connected between the first body part 140 and the second body part 150.

Since the second body part 150 is attached to the circuit board 11, the external force applied from the lamp 70 is absorbed by the elastic part 280 between the first body part 140 and the second body part 150. The elastic part 280 shrinks mainly in the lengthwise direction of the lamp 70, so that a distance W4 between the first body part 140 and the second body part 150 is reduced.

Figure 10:
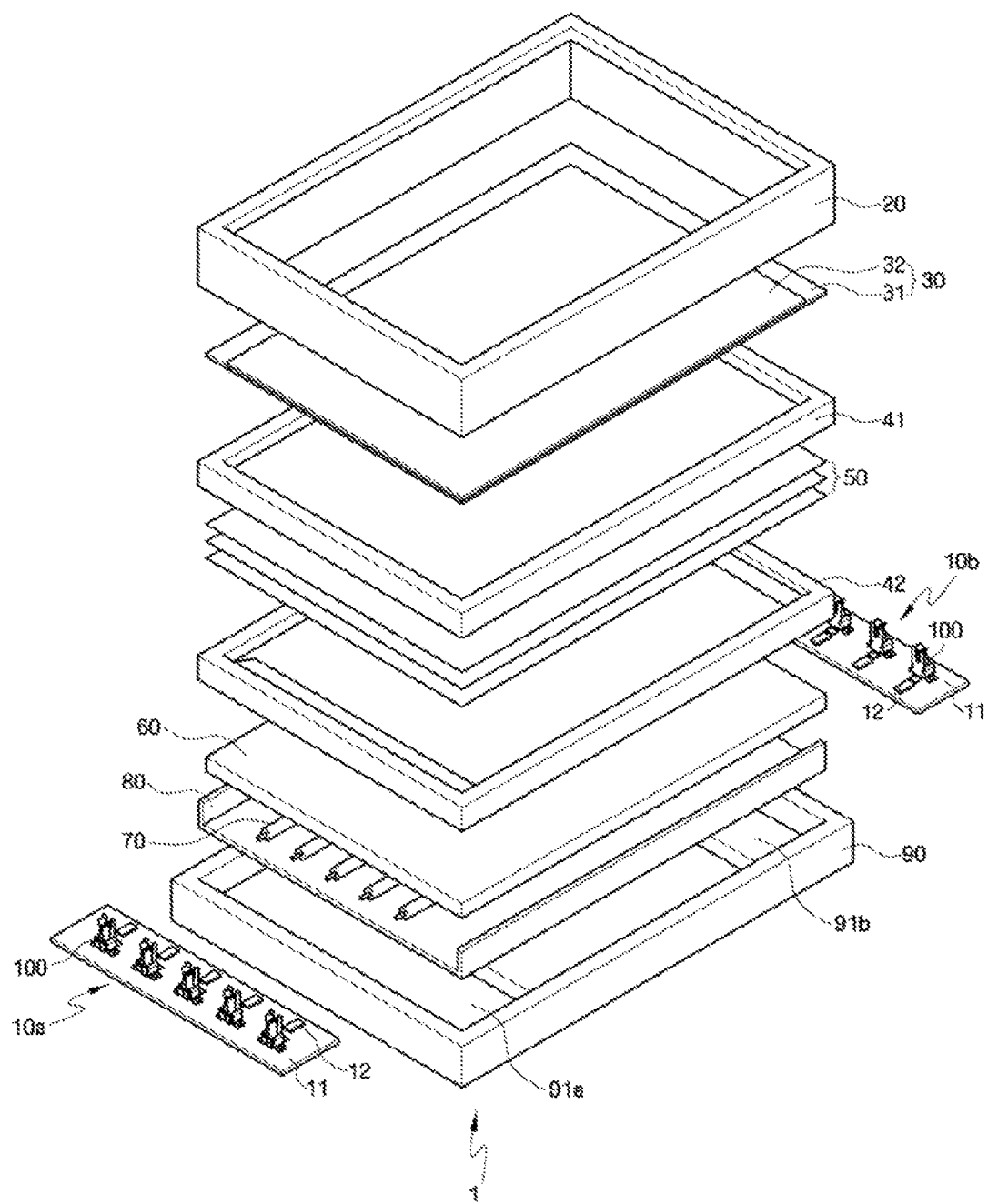
FIG. 10 is a partly exploded perspective view of a liquid crystal display according to an exemplary embodiment of the present invention.
Figure 11:
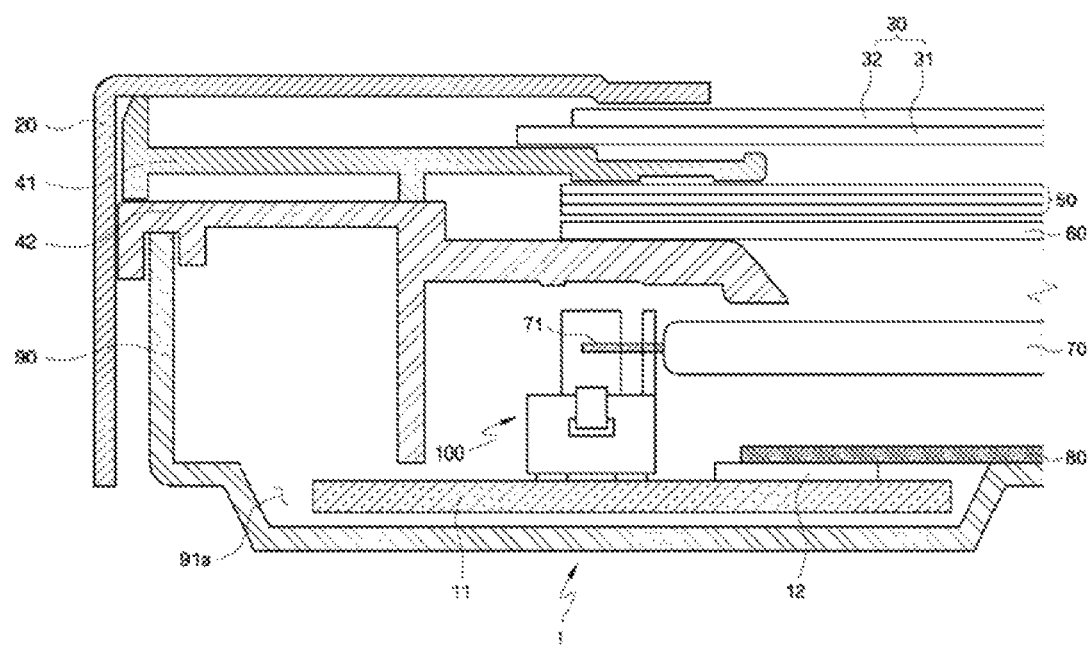
FIG. 11 is a cross-sectional view of the liquid crystal display shown in FIG. 10.

A liquid crystal display according to an exemplary embodiment of the present invention will be explained in detail below with reference to FIGS. 10 and 11. FIG. 10 is a partly exploded perspective view of a liquid crystal display according to an exemplary embodiment of the present invention, and FIG. 11 is a cross-sectional view of the liquid crystal display shown in FIG. 10.

The display device 1, e.g., an LCD, includes a display panel 30, an upper receiving container 20, a first frame 41, optical sheets 50, a diffusion plate 60, a second frame 42, a lamp 70, balance boards 10a and 10b, a reflective plate 80, and a lower receiving container 90.

The display panel 30 includes a lower substrate 31 and an upper substrate 32. The lower substrate 31 includes gate lines (not shown), data gate lines (not shown), and a thin film transistor (TFT) array. The upper substrate 32 includes black matrixes, and a common electrode. The display panel 30 displays image information.

The upper receiving container 20 constitutes an external appearance of the display device 1, and has an internal space in which the display panel 30 is accommodated. An opening window for exposing the display panel 30 to the exterior of the upper receiving container 20 is formed at a central area of the upper receiving container 20.

The upper receiving container 20 is coupled to the lower receiving container 90. If necessary, first and second frames 41 and 42 accommodating the display panel 30 and the optical sheets 50 may be disposed between the upper receiving container 20 and the lower receiving container 90.

The optical sheets 50 diffuse and focus light coming from the diffusion plate 60, and are disposed on the diffusion plate 60 to be accommodated in the upper receiving container 20 and the lower receiving container 90.

The optical sheets 50 may include a first prism sheet, a second prism sheet, a protective sheet, and various other sheets, for example, having similar properties.

The first prism sheet and the second prism sheet enhance the brightness of the LCD within an effective range of viewing angle by collimating light with a small angle of incidence by refracting the light coming from the diffusion plate 60.

The protective sheet formed above the first prism sheet and the second prism sheet serves to protect surfaces of the first and second prism sheets and diffuse light to enhance uniform distribution of light. The configuration of the optical sheets 50 is not limited to the aforementioned example, and may vary in many ways according to the specification of the display device 1.

The diffusion plate 60 serves to diffuse light coming from the lamp 70 in all directions and prevents bright lines from appearing on a front face of the display device 1 according to the shape of the lamp 70.

The lamp 70 may be a cold cathode fluorescent lamp ("CCFL"), a hot cathode fluorescent lamp ("HCFL"), or other types of light sources such as an incandescent lamp or a lamp including an array of light emitting diodes (LEDs). Where an HCFL is used, each lamp 70 includes two terminals at its opposite ends. The terminals are inserted into the lamp socket 100 to be supplied with power. Meanwhile, the lamp socket 100 is mounted on the circuit board 11, constituting balance boards 10a and 10b. The balance boards 10a and 10b are inserted into board insertion slits 91a and 91b formed on a bottom surface of the lower receiving container 90. Here, an insulation pad (not shown) may be disposed between each of the balance boards 10a and 10b and the lower receiving container 90.

The balance boards 10a and 10b receive a driving voltage from an inverter (not shown) and supply a uniform driving current to the lamp 70. The balance boards 10a and 10b includes at least one lamp socket 100 connected to the lead 71 of the lamp 70. The balance boards 10a and 10b may include balance coils or capacitors 12 for supplying uniform driving current to the lamp. The driving voltage applied to the balance boards 10a and 10b is supplied to the lamp 70 through the balance coils or capacitors.

In the following, an explanation will be given in conjunction with balance boards 10a and 10b including capacitors, the invention is not so limited, and the same is true of balance boards including balance coils.

Each of the balance boards 10a and 10b includes a circuit board 11, lamp sockets 100 and capacitors 12. The circuit board 11 is made of an insulator material, and the lamp sockets 100 are mounted thereon. The lamp sockets 100 may be attached to the circuit board 11 by surface mount technology (SMT). For example, fixing parts 160a and 160b of each of the lamp sockets 100 are fixed to the circuit board 11 by SMT.

The fixing parts 160a and 160b may be attached to a surface of the circuit board 11, for example, using a floor-dipping method or a floor-soldering method. As described above, the lamp sockets 100 can be attached to the circuit board 11 using an automatic device based on SMT.

The capacitors 12 are mounted on the circuit board 11. Each of the capacitors 12 allows uniform driving current to be applied to each of the lamp sockets 100, and has one terminal thereof connected to the lamp socket 100 and the other terminal thereof connected to a power supply. The capacitors 12 may be connected to the lamp sockets 100, for example, one by one. The present invention, however, is not limited to the foregoing. The capacitors 12 may be mounted on the circuit board 11, and/or the capacitors 12 may be mounted on the lamp socket 100. The capacitors 12 may alternatively be mounted at terminal portions of the respective lamps 70.

Further, the capacitors 12 may have a multi-layer ceramic capacitor (MLCC) structure, for example. A multi-layer ceramic capacitor including ceramic having a high dielectric constant may be used as a dielectric between electrodes, and can be of a relatively small-size. The small-sized, multi-layer ceramic capacitor can also achieve a large-capacity capacitor.

While exemplary embodiments of the present invention have been particularly shown and described with reference to the figures, it will be understood by those of ordinary skill in the art that various changes in form and details may be made therein without departing from the spirit and scope of the present invention.

What is claimed is:

1. A display device including:
   a liquid crystal display panel;
   a backlight lamp for illuminating the liquid crystal display panel; and
   a lamp socket for receiving a backlight lamp,
   wherein the lamp socket includes:
      a first body part;
      a connection terminal connected to the first body part for receiving a lead of a lamp;
      a second body part that is spaced apart from the first body part;
      an elastic part that connects the first body part with the second body part that expands and shrinks in a lengthwise direction of the lamp; and
      a fixing part that extends from the second body part for mounting the lamp socket.

2. A lamp socket comprising:
   a first body part;
   a connection terminal connected to the first body part for receiving a lead of a lamp;
   a second body part that is spaced apart from the first body part;
   an elastic part that connects the first body part with the second body part that expands and shrinks in a lengthwise direction of the lamp;
   a fixing part that extends from the second body part for mounting the lamp socket;
   a guide groove that extends in the lengthwise direction of the lamp and is formed on either the first body part or the second body part; and
   a guide part that protrudes from the other of the first body part or the second body part and inserts into the guide groove,
   wherein the guide groove includes a first guide groove formed on the first body part and a second guide groove formed on the second body part, and wherein the guide part penetrates through the first body part and the second body part.

3. The lamp socket of claim 2, wherein the elastic part includes a metal or a conductive elastomer.

4. The lamp socket of claim 2, wherein the elastic part is bent in a horizontal or vertical direction.

5. The lamp socket of claim 2, wherein the elastic part is integrally formed with the first body part and the second body part.

6. The lamp socket of claim 2, further comprising:
   a guide groove that extends in the lengthwise direction of the lamp and is formed on either the first body part or the second body part; and
   a guide part that protrudes from the other of the first body part or the second body part and inserts into the guide groove.

7. The lamp socket of claim 6, wherein a width of the guide groove is greater than that of the guide part with respect to the lengthwise direction of the lamp.

8. A display device comprising:
   a display device backlight lamp radiating light; and
   a lamp socket receiving the display device backlight lamp, the lamp socket including a first body part, a connection terminal connected to the first body part for receiving a lead of the lamp, a second body part that is spaced apart from the first body part, an elastic part that connects the first body part with the second body part that expands and shrinks in a lengthwise direction of the lamp, and a fixing part that extends from the second body part for mounting the lamp socket to the display device.

9. A display device comprising:
   a lamp radiating light;
   a lamp socket that includes a first body part, a connection terminal connected to the first body part for receiving a lead of the lamp, a second body part that is spaced apart from the first body part, an elastic part that connects the first body part with the second body part that expands and shrinks in a lengthwise direction of the lamp, and a fixing part that extends from the second body part for mounting the lamp socket to the display device;
   a guide groove that is cut in a lengthwise direction of the lamp and formed on either the first body part or the second body part; and
   a guide part that protrudes from the other of the first body part or the second body part and is inserted into the guide groove,
   wherein the guide groove includes a first guide groove formed on the first body part and a second guide groove formed on the second body part, and wherein the guide part penetrates through the first body part and the second body part.

10. The display device of claim 9, further comprising a circuit board on which the lamp socket is mounted.

11. The display device of claim 10, wherein the elastic part is bent in a direction that is parallel to or perpendicular to the circuit board.

12. The display device of claim 9, wherein the elastic part is formed inside the first body part.

13. The display device of claim 9, wherein the elastic part connects a lower portion of the first body part to a lower portion of the second body part.

14. The display device of claim 9, wherein the elastic part is integrally formed with the first and second body parts.

15. The display device of claim 9, further comprising:
a guide groove that is cut in a lengthwise direction of the lamp and formed on either the first body part or the second body part; and
a guide part that protrudes from the other of the first body part or the second body part and is inserted into the guide groove.

16. The display device of claim 15, wherein a width of the guide groove is greater than that of the guide part with respect to the lengthwise direction of the lamp.

17. A display device comprising:
a lamp radiating light;
a lamp socket that includes a first body part, a connection terminal connected to the first body part for receiving a lead of the lamp, a second body part that is spaced apart from the first body part, an elastic part that connects the first body part with the second body part that expands and shrinks in a lengthwise direction of the lamp, and a fixing part that extends from the second body part for mounting the lamp socket to the display device;
a guide groove that is cut in a lengthwise direction of the lamp and formed on either the first body part or the second body part; and
a guide part that protrudes from the other of the first body part or the second body part and is inserted into the guide groove,
wherein the guide part is formed by bending the first body part or the second body part.

18. A display device comprising:
a lamp radiating light;
a lamp socket that includes a first body part, a connection terminal connected to the first body part for receiving a lead of the lamp, a second body part that is spaced apart from the first body part, an elastic part that connects the first body part with the second body part that expands and shrinks in a lengthwise direction of the lamp, and a fixing part that extends from the second body part for mounting the lamp socket to the display device; and
a bent part that connects the first body part with the connection terminal and includes a first part connected to the connection terminal and a second part connected to the first body part, at least portions of the first part and the second part overlapping each other.

19. The display device of claim 18, wherein the bent part is bent to have an 'S' shaped section.

20. A display device comprising:
a lamp radiating light;
a lamp socket that includes a first body part, a connection terminal connected to the first body part for receiving a lead of the lamp, a second body part that is spaced apart from the first body part, an elastic part that connects the first body part with the second body part that expands and shrinks in a lengthwise direction of the lamp, and a fixing part that extends from the second body part for mounting the lamp socket to the display device;
a circuit board on which the lamp socket is mounted; and
a receiving container in which the circuit board and the lamp socket are accommodated, and a board insertion slit recessed from a portion of a bottom surface of the receiving container, the board insertion slit accommodating the circuit board.

* * * * *